(12) United States Patent
Kang et al.

(10) Patent No.: US 9,776,702 B2
(45) Date of Patent: Oct. 3, 2017

(54) SYSTEM FOR SUPPLYING LIQUEFIED NATURAL GAS FUEL WITH LEAK DETECTION

(71) Applicant: HYUNDAI HEAVY INDUSTRIES CO., LTD., Ulsan (KR)

(72) Inventors: Min Ho Kang, Busan (KR); Ju Seog Han, Ulsan (KR); Jong Bum Lee, Ulsan (KR)

(73) Assignee: Hyundai Heavy Industries Co., Ltd., Ulsan (KR)

( * ) Notice: Subject to any disclaimer, the term of this patent is extended or adjusted under 35 U.S.C. 154(b) by 341 days.

(21) Appl. No.: 14/060,832

(22) Filed: Oct. 23, 2013

(65) Prior Publication Data

US 2014/0250921 A1    Sep. 11, 2014

(30) Foreign Application Priority Data

Mar. 6, 2013   (KR) ........................ 10-2013-0024164

(51) Int. Cl.
  *F25B 45/00*   (2006.01)
  *B63H 21/38*   (2006.01)
  (Continued)

(52) U.S. Cl.
  CPC ......... *B63H 21/38* (2013.01); *F02M 21/0215* (2013.01); *F02M 21/0293* (2013.01);
  (Continued)

(58) Field of Classification Search
  CPC ............ F17C 2260/038; F25B 2500/22; F25B 2500/222; F25B 2500/23
  (Continued)

(56) References Cited

U.S. PATENT DOCUMENTS 3,788,091 A * 1/1974 Miller .................... F01K 27/00
                                                       60/641.15
3,864,918 A   2/1975 Lorenz
              (Continued)

FOREIGN PATENT DOCUMENTS

CN   2194985    4/1995
CN   1898127    1/2007
              (Continued)

OTHER PUBLICATIONS

Office Action dated Oct. 7, 2014 for Japanese Patent Application No. 2013-194607.
(Continued)

*Primary Examiner* — David Teitelbaum
(74) *Attorney, Agent, or Firm* — Ladas & Parry, LLP

(57) ABSTRACT

The system heats glycol water using steam generated by a boiler and heating LNG using the glycol water, thereby increasing efficiently the LNG to temperature required for an engine. In addition, the system senses LNG flowing to a glycol tank using a pressure sensor, etc. when the LNG flows to the glycol tank due to pressure difference between a fuel supplying line and a glycol circulation line generated according as a heat exchanger is broken down, and outputs the flowed LNG to the outside. As a result, the glycol circulation line may be returned to original state and stability of the system may be enhanced.

20 Claims, 2 Drawing Sheets

(51) Int. Cl.
*F02M 21/02* (2006.01)
*F02M 21/06* (2006.01)
*F17C 7/04* (2006.01)

(52) U.S. Cl.
CPC ............... *F02M 21/06* (2013.01); *F17C 7/04* (2013.01); *F17C 2221/033* (2013.01); *F17C 2223/0115* (2013.01); *F17C 2223/0161* (2013.01); *F17C 2227/0135* (2013.01); *F17C 2227/0323* (2013.01); *F17C 2260/038* (2013.01); *F17C 2265/07* (2013.01); *F17C 2270/0105* (2013.01); *F25B 2500/22* (2013.01); *F25B 2500/222* (2013.01); *F25B 2500/23* (2013.01); *Y02T 10/32* (2013.01)

(58) Field of Classification Search
USPC .......................................... 62/77, 149, 292
See application file for complete search history.

(56) References Cited

U.S. PATENT DOCUMENTS

| | | | | | |
|---|---|---|---|---|---|
| 4,506,508 | A | * | 3/1985 | Coers | F01K 9/003 165/110 |
| 5,095,709 | A | * | 3/1992 | Billiot | F17C 9/02 60/618 |
| 5,107,906 | A | * | 4/1992 | Swenson | F17C 9/02 141/11 |
| 5,142,876 | A | * | 9/1992 | Snider | F25B 45/00 62/149 |
| 5,325,673 | A | * | 7/1994 | Durr | C10G 5/06 62/634 |
| 7,497,191 | B2 | * | 3/2009 | Fulton | G06Q 30/0225 123/3 |
| 2007/0193285 | A1 | * | 8/2007 | Knight | F25B 43/04 62/126 |
| 2007/0193717 | A1 | * | 8/2007 | Turini | F02M 21/06 165/43 |
| 2009/0107157 | A1 | * | 4/2009 | Dube | F25B 49/005 62/149 |
| 2010/0146971 | A1 | * | 6/2010 | Mak | F01K 13/00 60/651 |
| 2010/0330511 | A1 | * | 12/2010 | Moldovanu | F23L 15/04 431/11 |
| 2011/0132003 | A1 | * | 6/2011 | Pozivil | F17C 7/04 62/45.1 |

FOREIGN PATENT DOCUMENTS

| | | |
|---|---|---|
| CN | 101382099 | 3/2009 |
| CN | 102235269 | 11/2011 |
| DE | 10 2007 012791 | 9/2008 |
| JP | 2002-323398 | 11/2002 |
| JP | 2004-360878 | 12/2004 |
| JP | 2008-539384 | 11/2008 |
| JP | 2011-520081 | 7/2011 |
| JP | 2012-255350 A | 12/2012 |
| JP | 2013-507585 | 3/2013 |
| KR | 1020110033476 A | 3/2011 |
| KR | 1020120066824 A | 6/2012 |
| KR | 10-2012-0126755 | 11/2012 |
| KR | 1020120126756 A | 11/2012 |
| KR | 1020130004401 A | 1/2013 |
| WO | 2009/136793 | 11/2009 |

OTHER PUBLICATIONS

Extended European Search Report dated Apr. 23, 2014 for corresponding European Patent Application No. 13183874.0.
Office Action dated Dec. 15, 2015 for Chinese Patent Application No. 201310574348.7 and its English translation by Google translate.

* cited by examiner

SYSTEM FOR SUPPLYING LIQUEFIED NATURAL GAS FUEL WITH LEAK DETECTION

CROSS-REFERENCE TO RELATED APPLICATIONS

This application claims priority from Korean Patent Application No. 10-2013-0024164, filed on Mar. 6, 2013, the contents of which are incorporated herein by reference in its entirety.

BACKGROUND

An embodiment of the present invention relates to a system for supplying LNG fuel.

A ship is a transport vehicle for sailing across the ocean, carrying bulk of minerals, crude oil, natural gas, several thousands of containers, etc. A ship is made of steel and moves by propulsion generated through the rotation of a propeller when it is floating on a water plane by buoyancy.

A ship generates propulsion by driving an engine. The engine moves a piston using a gasoline or diesel and rotates a crankshaft by a reciprocating motion performed by the piston, so that a shaft connected to the crankshaft rotates to drive the propeller.

However, recently, a Liquefied Natural Gas (LNG) carrier is using LNG fuel supplying method of driving an engine using LNG as a fuel. This LNG fuel supplying method has also been used in other ships in addition to the LNG carrier.

It is generally known that LNG is clean fuel and LNG deposits are greater than oil reserves. LNG consumption has surged with development of a mining technique and a transporting technique. Methane, which is the main component of LNG, is generally kept in a liquid state at a temperature of −162° C. or less under 1 atmospheric pressure. The volume of the liquefied methane is approximately $\frac{1}{600}$ of that of methane in a gaseous state as the standard state, and the specific gravity of the liquefied methane is 0.42, which is about half of the specific gravity of the crude oil.

However, the temperature and the pressure, etc. for driving the engine may be different from the state of LNG stored in a tank. Accordingly, research and development of a technique for supplying LNG to an engine by controlling the temperature and the pressure, etc. of the stored LNG in a liquid state has continued.

SUMMARY OF THE INVENTION

In an embodiment, a system for supplying LNG may heat glycol water using steam and heating the LNG up to a temperature required for an engine by using the heated glycol water, thereby increasing heat efficiency.

In an embodiment, a system for supplying LNG fuel may sense inflow of the LNG based on pressure of a glycol tank when the LNG, for circulating a fuel supplying line having relatively high pressure, flows to the glycol tank along a glycol circulation line having low pressure in the event a heat exchanger breaks down due to an unexpected cause and output the LNG to the outside according to the sensed result, thereby returning the internal pressure of the glycol tank to an original state.

A system for supplying LNG fuel according to an embodiment includes a fuel supplying line connected from an LNG storage tank to an engine; a pump provided on the fuel supplying line, and configured to pressurize LNG outputted from the LNG storage tank to high pressure; a heat exchanger provided on the fuel supplying line between the engine and the pump, configured to heat-exchange the LNG supplied from the pump with glycol water and supply the exchanged LNG to the engine; a glycol tank configured to store the glycol water; a glycol heater configured to heat the glycol water outputted from the glycol tank and supply the heated glycol water to the heat exchanger; an LNG inflow sensor configured to sense LNG leaked from the heat exchanger to the glycol tank; and an LNG removal valve connected to the glycol tank and configured to emit LNG flowed to the glycol tank when inflow of the LNG is sensed by the LNG inflow sensor.

The LNG inflow sensor may be a pressure sensor which is set at one side of the glycol tank and sense pressure of the glycol tank.

The LNG inflow sensor may be a temperature sensor which is set at one side of the glycol tank and sense temperature of fluid flowed to the glycol tank.

The heat exchanger may stop its operation when the LNG inflow sensor senses leakage of the LNG.

The LNG removal valve may be connected to the glycol tank by an LNG removal line.

The system may further include an LNG removal tray provided on an end of the LNG removal line and configured to remove LNG from mixing fluid of the LNG outputted from the glycol tank and the glycol water.

The system may further include a glycol water return line configured to return glycol water, remaining after the LNG is removed by the LNG removal tray, to the glycol tank. One terminal of the glycol water return line is connected to the LNG removal tray, and other terminal of the glycol water return line is connected to the glycol tank.

The system may further include a glycol pump configured to supply the glycol water stored in the glycol tank to the glycol heater.

The glycol pump may include a main glycol pump and an auxiliary glycol pump.

The heat exchanger may heat-exchange the LNG with the glycol water to heat the LNG and refrigerate the glycol water.

The glycol heater may heat the glycol water by using steam generated by a boiler.

A system for supplying LNG fuel according to an embodiment heats glycol water using steam generated by a boiler and heating LNG using the glycol water, thereby increasing efficiently the LNG to a temperature required for an engine.

In addition, the system senses LNG flowing to a glycol tank using a pressure sensor, etc. when the LNG flows to the glycol tank due to pressure difference between a fuel supplying line and a glycol circulation line generated according as a heat exchanger is damaged and emits the flowed LNG to the outside. As a result, the glycol circulation line may be returned to an original state and stability of the system may be enhanced.

BRIEF DESCRIPTION OF THE DRAWINGS

The above and other features and advantages of the present invention will become readily apparent by reference to the following detailed description when considered in conjunction with the accompanying drawings wherein.

DETAILED DESCRIPTION

Hereinafter, various embodiments of the present invention will be explained in more detail with reference to the accompanying drawings.

Figure 1:
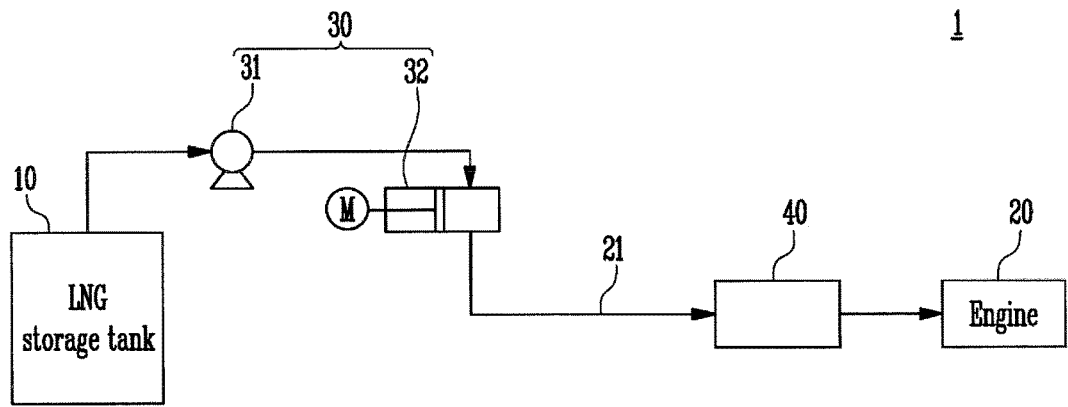
FIG. 1 is a conceptual view of a conventional system for supplying LNG fuel.

FIG. 1 is a conceptual view of a conventional system for supplying LNG fuel.

In FIG. 1, the conventional system 1 for supplying LNG fuel includes an LNG storage tank 10, an engine 20, a pump 30 and an electric heater 40. The LNG may include a natural gas NG in a supercritical state, etc. as well as an NG in a liquid state.

The system 1 uses the electric heater 40 for heating directly the LNG using applied electric energy. However, since the electric energy needed for driving the electric heater 40 is generated only by driving a generator (not shown) using fuel, cost increase due to fuel consumption and environmental pollution due to emission by fuel combustion, etc. may occur.

Figure 2:
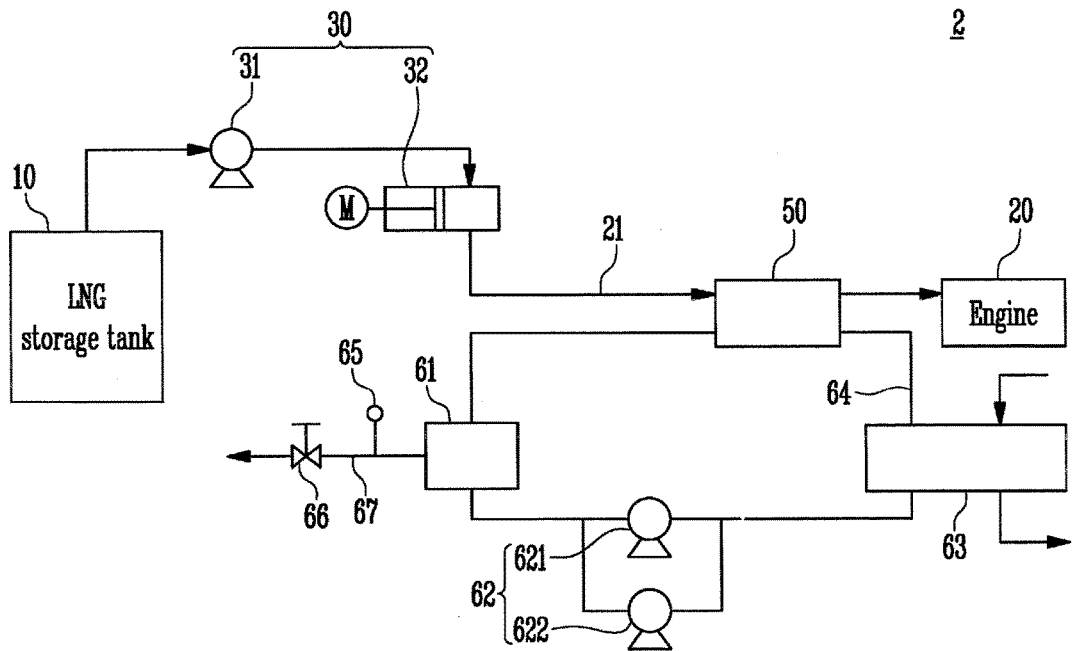
FIG. 2 is a conceptual view of a system for supplying LNG fuel according to an embodiment of the present invention.
Figure 3:
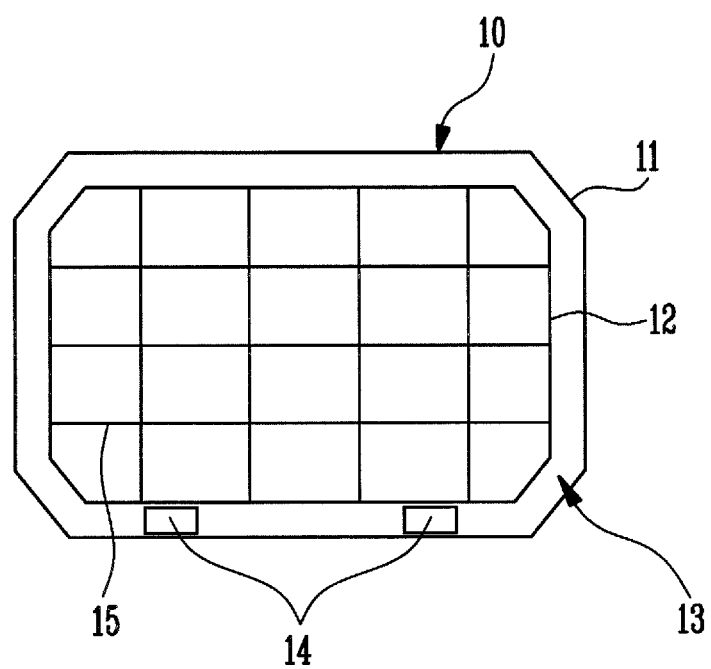
FIG. 3 is a sectional view illustrating an LNG storage tank in the system for supporting LNG fuel according to an embodiment of the present invention.

FIG. 2 is a conceptual view of a system for supplying LNG fuel according to an embodiment of the present invention, and FIG. 3 is a sectional view illustrating an LNG storage tank in the system for supporting LNG fuel according to an embodiment of the present invention.

In FIG. 2, the system 2 for supporting LNG fuel in an embodiment may include an LNG storage tank 10, an engine 20, a pump 30, a heat exchanger 50, a glycol tank 61, a glycol pump 62 and a glycol heater 63. The LNG storage tank 10, the engine 20, the pump 30, etc. use the same numerals as in the conventional system 1, but they may not be the same elements.

The LNG storage tank 10 stores an LNG to be supplied to the engine 20. The LNG storage tank 10 stores the LNG in a liquid state. Here, the LNG storage tank 10 may be pressure-type tank.

As shown in FIG. 3, the LNG storage tank 10 includes an outer tank 11, an inner tank 12 and an adiabatic section 13. The outer tank 11 may correspond to an outer wall of the LNG storage tank 10 and be made up of steel. A cross section of the LNG storage tank 10 may be polygonal shaped.

The inner tank 12 is formed in the outer tank 11 and may be provided in the outer tank 11 by a support 14. The support 14 may be formed under the inner tank 12, and be further provided on a side of the inner tank 12 to prevent a left and right motion.

The inner tank 12 may be made up of stainless, and be designed to tolerate the pressure of 5 bar to 10 bar (e.g., 6 bar). This is because an internal pressure of the inner tank 12 may be increased according as an LNG in the inner tank 12 is evaporated to generate the evaporation gas.

In an embodiment, a baffle 15 may be included in the inner tank 12. The baffle 15 may be a grid-patterned plate. The internal pressure of the inner tank 12 may be uniformly distributed due to the baffle 15 so as to prevent that only a part of the inner tank 12 is intensively with a pressure.

The adiabatic section 13 may be located between the inner tank 12 and the outer tank 11 and may prevent external thermal energy from being transferred to the inner tank 12. Here, the adiabatic section 13 may be in a vacuum state. The LNG storage tank 10 may have more efficient toleration to high pressure compared to common tanks, as the adiabatic section 13 is in a vacuum. For example, the LNG storage tank 10 may tolerate the pressure of 5 bar to 20 bar by using the adiabatic section 13 in a vacuum.

Since the system 2 in an embodiment uses the LNG storage tank 10 including the adiabatic section 13 which may be between the outer tank 11 and the inner tank 12 and be in a vacuum, the evaporation gas may be generated minimally. In addition, the LNG storage tank 10 may not break down even though its internal pressure increases.

The engine 20 is driven by the LNG supplied from the LNG storage tank 10 to generate power. Here, the engine 20 may be a MEGI engine or a dual fuel engine.

In the event that the engine 20 is the dual fuel engine, the LNG and the oil are not supplied as mixed but are selectively supplied. This prevents the LNG and the oil from being mixed, and so efficiency of the engine 20 may not be deteriorated. The combustion temperature of the LNG is different from that of the oil.

In the engine 20, a piston (not shown) in a cylinder (not shown) makes a reciprocating motion according to combustion of the LNG, and thus a crankshaft (not shown) connected to the piston may rotate, and a shaft (not shown) connected to the crankshaft may rotate. Accordingly, a propeller (not shown) connected to the shaft rotates when the engine 20 is driven, thereby moving the ship forward or backward.

In an embodiment, the engine 20 may be an engine for driving the propeller or an engine for generating electricity or power. That is, the type of the engine 20 is not limited. However, the engine 20 may be an internal combustion engine for generating driving force by combusting the LNG.

A fuel supplying line 21 for delivering the LNG may be formed between the LNG storage tank 10 and the engine 20. The pump 30, the heat exchanger 50, etc. may be provided on the fuel supplying line 21 to supply the LNG to the engine 20.

Here, a fuel supplying valve (not shown) is equipped on the fuel supplying line 21, and an amount of supply of the LNG may be adjusted depending on the open level of the fuel supplying valve.

The pump 30 is provided on the fuel supplying line 21 and pressurizes the LNG outputted from the LNG storage tank 10 to high pressure. The pump 30 may include a boosting pump 31 and a high pressure pump 32.

The boosting pump 31 may be provided on the fuel supplying line 21 between the LNG storage tank 10 and the high pressure pump 32 or in the LNG storage tank 10. The boosting pump 31 supplies an adequate amount of the LNG to the high pressure pump 32, thereby preventing cavitation of the high pressure pump 32. The boosting pump 31 may extract the LNG from the LNG storage tank 10, and pressurize the extracted LNG in a range of several bar to several tens bar. As a result, the LNG may be pressurized to the pressure of 1 bar to 25 bar by the boosting pump 31.

The LNG stored in the LNG storage tank 10 may be in a liquid state. In this case, the boosting pump 31 may pressurize the LNG outputted from the LNG storage tank 10 to increase the pressure and the temperature a bit higher, and the LNG pressurized by the boosting pump 31 may still be in a liquid state.

The high pressure pump 32 pressurizes the LNG outputted from the boosting pump 31 to high pressure so that the LNG is supplied to the engine 20. The LNG is outputted from the LNG storage tank 10 with the pressure of approximately 10 bar and then is first-pressurized by the boosting pump 31. The high pressure pump 32 second-pressurizes the LNG in a liquid state pressurized by the boosting pump 31 and supplies the second-pressurized LNG to the heat exchanger 50.

Here, the high pressure pump 32 may pressurize the LNG up to the pressure of, for example, 200 bar to 400 bar required for the engine 20 and supply the pressurized LNG to the engine 20, and so the engine 20 may produce the propulsion by using the LNG.

The high pressure pump 32 may pressurize the LNG in a liquid state outputted from the boosting pump 31 to high pressure and phase-change the LNG so that the LNG is in a supercritical state having the temperature and the pressure higher than the critical point. The temperature of the LNG in the supercritical state may be −20° C. or less, higher than critical temperature.

The high pressure pump 32 may change the LNG in a liquid state to LNG in a supercooled liquid state by pressurizing the LNG in a liquid state to high pressure. Here the supercooled liquid state means a state that the pressure of the LNG is higher than the critical pressure and the temperature of the LNG is lower than the critical temperature.

Particularly, the high pressure pump 32 may pressurize the LNG in a liquid state outputted from the boosting pump 31 to high pressure of 200 bar to 400 bar, and down the temperature of the LNG to temperature lower than the critical temperature, thereby phase-changing the state of the LNG to a supercooled liquid state. Here, the temperature of the LNG in a supercooled liquid state may be, for example −140° C. to −60° C., which is lower than the critical temperature.

The heat exchanger 50 is provided on the fuel supplying line 21 between the engine 20 and the pump 30, heat-exchanges the LNG supplied from the pump 30 with glycol water, and then supplies the exchanged LNG to the engine 20. The pump 30 for supplying the LNG to the heat exchanger 50 may be the high pressure pump 32. The heat exchanger 50 may heat the LNG in a supercooled liquid state or supercritical state while substantially maintaining the pressure of 200 bar to 400 bar outputted from the high pressure pump 32, thereby changing the LNG to LNG in a supercritical state which is from 40° C. to 60° C. Subsequently, the heat exchanger 50 may supply the changed LNG to the engine 20.

The amount of heat applied to the LNG by the heat exchanger 50 may vary according to phase-change of the LNG due to the high pressure pump 32. In the event that the high pressure pump 32 phase-changes the state of the LNG to a supercritical state, the heat exchanger 50 heats the LNG from temperature of −20° C. to temperature of 40° C. to 60° C. In the event that the high pressure pump 32 phase-changes the state of the LNG to a supercooled liquid state, the heat exchanger 50 heats the LNG from the temperature of −60° C. to temperature of 40° C. to 60° C.

The heat exchanger 50 may heat the LNG by using glycol water supplied from the glycol heater 63. The glycol water means a fluid generated by mixing ethylene glycol and water, be heated by the glycol heater 63, be refrigerated by the heat exchanger 50, and be circulated.

The temperature of the glycol water outputted from the heat exchanger 50 after heat-exchanged with LNG may vary depending on the phase-change of the LNG of the high pressure pump 32. That is, in the event that the high pressure pump 32 phase-changes the state of the LNG to a supercooled liquid state and supplies the LNG to the heat exchanger 50, the glycol water may be refrigerated with heating the LNG in a supercooled liquid state up to temperature of 40° C. to 60° C. In the event that the high pressure pump 32 phase-changes the state of the LNG to a supercritical state and then supplies the LNG to the heat exchanger 50, the glycol water may be refrigerated with heating the LNG in a supercritical state up to a temperature required for the engine 20, temperature of the supercritical state being higher than that of the supercooled liquid state. The glycol water when the glycol water heat-exchanges with the LNG in a supercooled liquid state may be refrigerated to temperature lower than the glycol water when the glycol water heat-exchanges with the LNG in a supercritical state, and then be supplied to the glycol tank 61.

The glycol tank 61 may store the glycol water. The glycol tank 61 may store the glycol water at the temperature at which cracking of the glycol water can be prevented. The cracking means a phenomenon where water and ethylene glycol are separated due to the phase-change of the water.

The glycol pump 62 is provided on the lower portion of the glycol tank 61, and the glycol water may be supplied from the glycol tank 61 to the glycol heater 63 with constant amount by the glycol pump 62. The heat exchanger 50 may be connected to the upper portion of the glycol tank 61, apply heat to the LNG, and supply again the refrigerated glycol water to the glycol tank 61.

The glycol tank 61, the glycol pump 62, the glycol heater 63 and the heat exchanger 50 may be connected by a glycol circulation line 64. That is, the glycol water may flow sequentially to the glycol tank 61, the glycol pump 62, the glycol heater 63 and the heat exchanger 50 through the glycol circulation line 64, and so it may be heated or refrigerated.

The glycol pump 62 supplies the glycol water stored in the glycol tank 61 to the glycol heater 63. The glycol pump 62 may be located below the glycol tank 61 and include a main glycol pump 621 and an auxiliary glycol pump 622.

In the event that the LNG is heated by using the glycol water, the glycol water may flow normally from the glycol tank 61 to the glycol heater 63 by the main glycol pump 621. In the event that the main glycol pump 621 is not normally operated or the glycol water needs to be supplied to the glycol heater 63 by an amount greater than a maximum supplying amount of the main glycol pump 621 (this means a case that an output amount of the glycol heater 63 is relatively higher than an output amount of the main glycol pump 621), the auxiliary glycol pump 622 may operate to assist circulation of the glycol water.

Since the glycol water is continuously circulated by using the auxiliary glycol pump 622 even though the main glycol pump 621 cannot normally operate due to break-down, etc., the cranking phenomenon, where the glycol water is heat-exchanged continuously with the LNG having low temperature according as the glycol water is not outputted from heat exchanger 50 to the glycol tank 61 and thus water included in the glycol water is refrigerated and then separated from the glycol water, may be prevented.

The main glycol pump 621 and the auxiliary glycol pump 622 may be disposed in parallel, and be connected to the glycol circulation line 64 branched from the glycol tank 61, respectively. That is, the glycol circulation line 64 may be branched from a rear part of the glycol tank 61 and be respectively connected to the main glycol pump 621 and the auxiliary glycol pump 622. The glycol circulation lines 64 connected to a rear part of the main glycol pump 621 and a rear part of the auxiliary glycol pump 622 may be connected to the glycol heater 63 while merged.

The glycol heater 63 heats the glycol water outputted from the glycol tank 61, and then supplies the heated glycol water to the heat exchanger 50. The glycol heater 63 heats the glycol water with constant temperature, and thus the glycol water may supply adequate heat to the LNG in the heat exchanger 50.

The glycol heater 63 may heat the glycol water using electric energy or a steam. That is, the steam generated from a boiler (not shown) may be supplied to the glycol heater 63, the steam may apply heat to the glycol water, and the glycol water may refrigerate the steam. As a result, the glycol water may be heated and the steam may be condensed to condensate water.

Here, the condensate water may flow again to the boiler through a condensate water tank (not shown) and be changed to the steam, and then the steam may be again supplied to the glycol heater 63. The glycol water heated by the steam may be supplied from the glycol heater 63 to the heat exchanger 50.

The system 2 in an embodiment may further include an LNG inflow sensor 65 and an LNG removal valve 66.

The LNG inflow sensor 65 senses the LNG leaked from the heat exchanger 50 to the glycol tank 61. The LNG is supplied from the LNG storage tank 10 to the engine 20 through the boosting pump 31, the high pressure pump 32 and the heat exchanger 50. Here, the LNG has high pressure for 200 bar to 400 bar. Whereas, the glycol water may have low pressure considerably lower than the pressure of the LNG when it circulates through the glycol tank 61, the glycol pump 62 and the glycol heater 63.

In the event that the heat exchanger 50 is damaged by an unexpected cause, the LNG having high pressure may flow along the glycol circulation line 64 having low pressure, and may flow to the glycol tank 61 with the glycol water.

Internal pressure of the glycol tank 61 may sharply increase according as the LNG flows to the glycol tank 61, and thus the glycol tank 61 may be broken down because the glycol tank 61 cannot tolerate the internal pressure. The LNG flowed from the heat exchanger 50 may circulate up to the glycol pump 62 due to the increased internal pressure of the glycol tank 61, and the glycol pump 62 may be also broken down by gas particle of the LNG when the heated LNG flows to the glycol pump 62.

Accordingly, in the event that the LNG flows to the glycol circulation line 64 according as the heat exchanger 50 is broken down by a specific cause, the LNG inflow sensor 65 may sense the flowed LNG.

The LNG inflow sensor 65 may be a pressure sensor set to one side of the glycol tank 61. Since the LNG outputted from the heat exchanger 50 has high pressure of 200 bar to 400 bar, the internal pressure of the glycol tank 61 may sharply increase even though a small amount of the LNG flows to the glycol tank 61.

Accordingly, the LNG inflow sensor 65 may detect inflow of the LNG to the glycol tank 61 by sensing the pressure of the glycol tank 61. The LNG inflow sensor 65 may be connected in the glycol tank 61, or be set to an upstream portion or a downstream portion of the glycol tank 61.

The LNG inflow sensor 65 may be a temperature sensor set to one side of the glycol tank 61. Temperature of the glycol circulation line 64 for connecting the heat exchanger 50 to the glycol tank 61 when the LNG flows from the heat exchanger 50 to the glycol tank 61 with the glycol water may be lower than that when only the glycol water flows to the glycol tank 61. Accordingly, the LNG inflow sensor 65 may be set to the upstream portion of the glycol tank 61, and sense temperature of fluid flowed to the glycol tank 61, thereby detecting leakage of the LNG.

However, the temperature of the fluid flowing from the heat exchanger 50 to the glycol tank 61 may be a little changed even though the LNG is leaked, plural LNG inflow sensors 65 including the temperature sensor and the pressure sensor may be equipped. The LNG inflow sensors 65 may sense respectively the temperature and the internal pressure of the glycol tank 61, thereby detecting correctly leakage of the LNG.

Since it is determined that the heat exchanger 50 is broken down when the LNG inflow sensor 65 senses the leakage of the LNG, the heat exchanger 50 may communicate with the LNG inflow sensor 65 and stop its operation when the LNG is leaked. Here, flowing of the LNG supplied to the engine 20 may be stopped.

The LNG removal valve 66 is connected to the glycol tank 61 and emits the LNG flowed to the glycol tank 61 when the inflow of the LNG is sensed by the LNG inflow sensor 65. The LNG removal valve 66 may be connected to the glycol tank 61 by an LNG removal line 67, and the LNG in the glycol tank 61 may be outputted along the LNG removal line 67 when the LNG removal valve 66 is opened. The heat exchanger 50 may promptly stop its operation when the LNG inflow sensor 65 senses the leakage of the LNG, but the leaked LNG should be removed by the LNG removal valve 66 because the internal pressure of the glycol tank 61 may sharply increase by the leaked LNG.

The LNG removal valve 66 may keep closed state when the system 2 operates normally and be opened when flowing of the LNG is sensed from the heat exchanger 50 to the glycol tank 61 by the LNG inflow sensor 65. As a result, the LNG flowed in the glycol tank 61 may be emitted to the outside, and so the internal pressure of the glycol tank 61 may be reduced.

Here, the LNG removal valve 66 may be opened only for a predetermined time to emit the LNG in the glycol tank 61 or be opened until the LNG inflow sensor 65 stops sensing the LNG. Outlet of the glycol tank 61 may be cut off by a cut off valve (not shown) when the LNG removal valve 66 is opened, and so the LNG may not be flowed to the glycol pump 62.

Since the pressure of the LNG flowed to the glycol tank 61 is high pressure, mixed fluid of the LNG and the glycol water may be emitted to the LNG removal line 67, and so an amount of the glycol water may be reduced.

Accordingly, in the event that the LNG removal valve 66 is opened and then closed, the glycol tank 61 may measure again an amount of the glycol water, and may report that supplement of the glycol water is needed when the level of the glycol water is less than the predetermined water level.

A LNG removal tray (not shown) may be formed at an end of the LNG removal line 67. The LNG removal tray may be a means for removing only the LNG from the mixing fluid of the LNG and the glycol water emitted from the glycol tank 61 and using again the glycol water. The LNG removal tray may put the fluid in it, and a part of its top may be opened.

Since the LNG outputted from the glycol tank 61 is heat-exchanged with the glycol water, the LNG supplied to the LNG removal tray may be naturally emitted along the opened part of the top. However, the glycol water heat-exchanged with the LNG may have liquid state, and thus only the LNG may be separated by the LNG removal tray.

Here, the glycol water remaining after the LNG is removed may be returned to the glycol tank 61. The LNG removal tray may be connected to one terminal of a glycol water return line (not shown), and the other terminal of the glycol water return line may be connected to the glycol tank 61.

The system 2 in an embodiment heats the LNG to temperature required for the engine 20 by using the glycol water heated by the steam, thereby saving electric energy and realizing an eco-friendly system.

The system 2 senses inflow of the LNG and emits the LNG in the glycol tank 61 to the outside though the LNG flows to the glycol tank 61 due to break-down of the heat exchanger 50, thereby keeping constantly the internal pressure of the glycol tank 61.

Although embodiments have been described with reference to a number of illustrative embodiments thereof, it should be understood that numerous other modifications and embodiments can be devised by those skilled in the art that will fall within the spirit and scope of the principles of this disclosure.

What is claimed is:

1. A system for supplying LNG fuel, the system comprising:
   a fuel supplying line connected from an LNG storage tank to an engine;
   a pump provided on the fuel supplying line and configured to pressurize LNG outputted from the LNG storage tank to high pressure;
   a heat exchanger provided on the fuel supplying line between the engine and the pump, configured to heat-exchange the LNG supplied from the pump with glycol water and supply the exchanged LNG to the engine;
   a glycol tank configured to store the glycol water;
   a glycol heater configured to heat the glycol water outputted from the glycol tank and supply the heated glycol water to the heat exchanger;
   one or more LNG inflow sensors configured to sense LNG leaked from the heat exchanger to the glycol tank along a glycol circulation line and set at the glycol tank; and
   an LNG removal line connected to the glycol tank and configured to emit LNG flowed to the glycol tank when inflow of the LNG is sensed by the LNG inflow sensor,
   wherein the heat exchanger stops a heat exchanger operation when the one or more LNG inflow sensors senses leakage of the LNG.

2. The system of claim 1, wherein at least one of the LNG inflow sensors is a pressure sensor which is set at one side of the glycol tank and senses pressure of the glycol tank.

3. The system of claim 1, wherein at least one of the LNG inflow sensors is a temperature sensor which is set at one side of the glycol tank and senses temperature of fluid flowed to the glycol tank.

4. The system of claim 1, wherein an LNG removal valve is connected to the glycol tank by the LNG removal line.

5. The system of claim 4, further comprising:
   an LNG removal tray provided on an end of the LNG removal line and configured to remove LNG from mixed fluid of the LNG outputted from the glycol tank and the glycol water.

6. The system of claim 5, further comprising:
   a glycol water return line configured to return glycol water, remaining after the LNG is removed by the LNG removal tray, to the glycol tank, wherein one terminal of the glycol water return line is connected to the LNG removal tray, and another terminal of the glycol water return line is connected to the glycol tank.

7. The system of claim 4, further comprising a cut off valve configured to cut off an outlet of the glycol tank when the LNG removal valve is opened.

8. The system of claim 1, further comprising:
   a glycol pump configured to supply the glycol water stored in the glycol tank to the glycol heater.

9. The system of claim 8, wherein the glycol pump includes a main glycol pump and an auxiliary glycol pump.

10. The system of claim 1, wherein the heat exchanger heat-exchanges the LNG with the glycol water to heat the LNG and refrigerates the glycol water.

11. The system of claim 1, wherein the glycol heater heats the glycol water by using steam generated by a boiler.

12. The system of claim 1, wherein the heat exchanger is configured to supply the LNG in a supercritical state.

13. The system of claim 1, wherein the heat exchanger is configured to supply the LNG at a temperature from 40° C. to 60° C.

14. The system of claim 1, wherein the heat exchanger is configured to maintain a pressure from 200 bar to 400 bar.

15. The system of claim 1, wherein at least one of the LNG inflow sensors is positioned at an upstream portion of the glycol tank.

16. The system of claim 1, wherein at least one of the LNG inflow sensors is positioned at a downstream portion of the glycol tank.

17. The system of claim 1, further comprising a LNG removal tray connected to the LNG removal line to separate the LNG from fluid mixed with the LNG and the glycol water.

18. The system of claim 1, wherein the heat exchanger is configured to supply the LNG at a temperature equal or less than 60° C.

19. The system of claim 1, wherein the glycol pump comprises a main glycol pump and an auxiliary glycol pump which are arranged parallel to each other.

20. The system of claim 1, wherein the LNG inflow sensors comprise:
   a pressure sensor configured to sense a pressure in the glycol tank and positioned at the glycol tank; and
   a temperature sensor configured to sense a temperature of an upstream of the glycol tank and positioned at a upstream portion of the glycol tank.

* * * * *